(12) United States Patent
Goehlich et al.

(10) Patent No.: US 8,496,207 B2
(45) Date of Patent: Jul. 30, 2013

(54) CONNECTION OF CABIN COMPONENTS, CABIN COMPONENT AND METHOD FOR CONNECTING CABIN COMPONENTS

(75) Inventors: Robert Alexander Goehlich, Hamburg (DE); Daniel Wenninger, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 219 days.

(21) Appl. No.: 12/836,641

(22) Filed: Jul. 15, 2010

(65) Prior Publication Data

US 2011/0011976 A1 Jan. 20, 2011

Related U.S. Application Data

(60) Provisional application No. 61/225,566, filed on Jul. 15, 2009.

(30) Foreign Application Priority Data

Jul. 15, 2009 (DE) .......................... 10 2009 033 299

(51) Int. Cl.
*B64C 1/22* (2006.01)
*B64D 11/00* (2006.01)

(52) U.S. Cl.
USPC ...................... 244/131; 244/118.1; 244/118.5

(58) Field of Classification Search
USPC ......... 244/118.1, 118.2, 118.5, 131; 312/247, 312/246; 211/94.02, 90.02
See application file for complete search history.

(56) References Cited

U.S. PATENT DOCUMENTS

| 5,549,258 A * | 8/1996 | Hart et al. .................. 244/118.1 |
| 2006/0086886 A1 * | 4/2006 | Humfeldt et al. ............. 248/636 |
| 2006/0091257 A1 | 5/2006 | Melberg et al. |
| 2007/0084966 A1 | 4/2007 | Haynes et al. |
| 2009/0014586 A1 * | 1/2009 | Gross et al. .................. 244/119 |
| 2009/0026318 A1 | 1/2009 | Gross et al. |

FOREIGN PATENT DOCUMENTS

| DE | 102007032233 A1 | 1/2009 |
| WO | WO 9838089 A1 | 9/1998 |

* cited by examiner

*Primary Examiner* — Tien Dinh
*Assistant Examiner* — Richard R Green
(74) *Attorney, Agent, or Firm* — Leydig, Voit & Mayer, Ltd.

(57) ABSTRACT

A connection device for a plurality of cabin components of an aircraft includes a rail extending in a longitudinal direction of an aircraft structure, wherein the plurality of cabin components is disposed on the rail; and a plurality of adjustment devices configured to self-adjust each of the plurality of cabin components in the longitudinal direction.

11 Claims, 1 Drawing Sheet

CONNECTION OF CABIN COMPONENTS, CABIN COMPONENT AND METHOD FOR CONNECTING CABIN COMPONENTS

CROSS REFERENCE TO PRIOR APPLICATIONS

Priority is claimed to German Application No. DE 10 2009 033 299.5, filed Jul. 15, 2009 and U.S. Provisional Application No. 61/225,566, filed Jul. 15, 2009. The entire disclosure of both applications is incorporated by reference herein.

FIELD

The invention relates to connection means for cabin components and to a method for connecting cabin components.

BACKGROUND

Cabin components, in particular hatracks in aircraft, are in each case supported in the x-, y- and z-directions on primary structure sections of the aircraft. Support in the y- and z-directions, i.e. in the direction of the transverse axis of the aircraft and in the direction of the vertical axis of the aircraft, usually takes place by way of eye bolt connections. In the x-direction, i.e. in longitudinal direction of the aircraft, the hatracks are guided in dedicated rails that are separate from each other so that adjustment of the hatracks in longitudinal direction of the aircraft relative to each other is possible. Adjustment frequently takes place by way of adjustable threaded rods, each being supported by a hatrack, and that engage a frame element section. By means of these threaded rods the respective gap between adjacent hatracks can be set. However, since the hatracks are arranged one behind the other in longitudinal direction of the aircraft, and since a provided overall length of the arranged hatracks must not be exceeded, the gaps are in direct effective connection with each other so that, for example, readjustment of a gap directly affects the gap width of the remaining gaps, and consequently these also need to be readjusted. In addition, adjacent hatracks are interconnected in their bottom region by way of an adjustable connection means, and consequently these connection means too need to be set anew during readjustment. This adjustment is thus very time-consuming.

The German patent application DE 10 2007 032 233 A1 of the applicant discloses a connection of the hatracks by way of a common rail that extends in the x-direction of an aircraft. However, this application does not provide any details relating to the adjustment of the hatracks in longitudinal direction of the aircraft, so that it must be assumed that conventional adjustment by way of threaded rods applies.

SUMMARY OF THE INVENTION

It is an aspect of the present invention to provide a connection means for cabin components in an aircraft, which connection means eliminates the above-mentioned disadvantages and makes possible fast alignment of adjacent cabin components, as well as a cabin component and a method for connecting cabin components.

A connection means according to the invention for cabin components, in particular for hatracks in aircraft, which cabin components are arranged on a rail that extends in longitudinal direction of a structure, according to the invention comprises adjustment devices for self-adjustment of the cabin components in longitudinal direction of the structure. The adjustment device makes possible automatic adjustment of the cabin components in longitudinal direction of the structure so that there are no longer any elaborate manual adjustment steps. This makes it possible to quickly align the cabin components relative to each other. Maladjustment and time-consuming readjustment are avoided. Furthermore, there is no need to provide a separate adjustable connection means in the bottom region of the cabin components.

In an exemplary embodiment the adjustment devices comprise adjustment spikes which in some sections engage receiving devices. Such adjustment devices are technically easy to produce and due to their low number of components are reliable and troublefree in operation.

In an exemplary embodiment the adjustment spikes are arranged on the side of the cabin component, and the receiving devices are arranged on the side of the structure. This facilitates the arrangement of the cabin components on the rail. For weight optimisation the receiving devices can be implemented directly in the rail so that no further adjustment elements on the side of the structure are required to form the receiving devices.

However, the receiving devices can also be implemented in an adjustment strip that extends parallel to the rail. This results in separation of the arrangement of the cabin components on the rail from their adjustment so that, for example, in a rail with marginal component tolerances a desired adjustment can still take place.

The adjustment spikes can be brought to an adjustment position automatically or manually, wherein by means of automatic engagement of the adjustment spikes the time required for installing the cabin components can be further reduced. Automatic engagement of the adjustment spikes can, for example, take place by spring-reloading said adjustment spikes.

In an exemplary embodiment the adjustment spikes are dimensioned in such a manner that they also take up loads in the x-direction so that support elements which normally takes the loads acting in longitudinal direction of the aircraft can be avoided.

Preferably, by way of the adjustment devices a respective inclination of the individual cabin components on the longitudinal axis of the structure is adjustable so that the cabin components can be aligned relative to each other not only in the x-direction but also as far as their inclination towards each other is concerned.

The arrangement of the cabin components on the rail can be in a pod-like manner or by way of individual positioning in the region of their respective desired position. The arrangement in a pod-like manner provides an ergonomic advantage in that there is no need for the installing personnel to transport the cabin components over large distances, but instead said cabin components can be slid onto the rail near a delivery region for cabin components.

The rail can comprise a hole pattern for receiving a fastening element of the respective cabin component. The hole pattern provides an advantage in that preliminary adjustment of the cabin components relative to each other can take place, as can fine adjustment by means of the adjustment device. In order to compensate, for example, for component tolerances of the cabin components or for production tolerances of the hole pattern it is advantageous if the hole pattern comprises elongated holes that permit longitudinal compensation in the x-direction.

A cabin component according to the invention, in particular a hatrack for an aircraft, which cabin component is arranged on a rail that extends in longitudinal direction of a structure, according to the invention comprises an adjustment device for self-adjustment in longitudinal direction of the structure.

In a method according to the invention for connecting cabin components, in particular hatracks in an aircraft, to a rail that extends in longitudinal direction of a structure, first the cabin components are arranged on the rail. Thereafter, the cabin components are positioned in longitudinal direction of the structure in the region of their desired position. Thereafter, an adjustment device for self-adjustment of the respective cabin component in its desired position is activated, wherein self-adjustment takes place manually or automatically.

BRIEF DESCRIPTION OF THE DRAWINGS

Below, preferred exemplary embodiments of the invention are explained in more detail with reference to diagrammatic illustrations. The following are shown.

In the figures the same design elements have the same reference characters, wherein in the case of a figure comprising several identical design elements, for the sake of clarity, only some of these design elements comprise a reference character.

DETAILED DESCRIPTION

Figure 1:
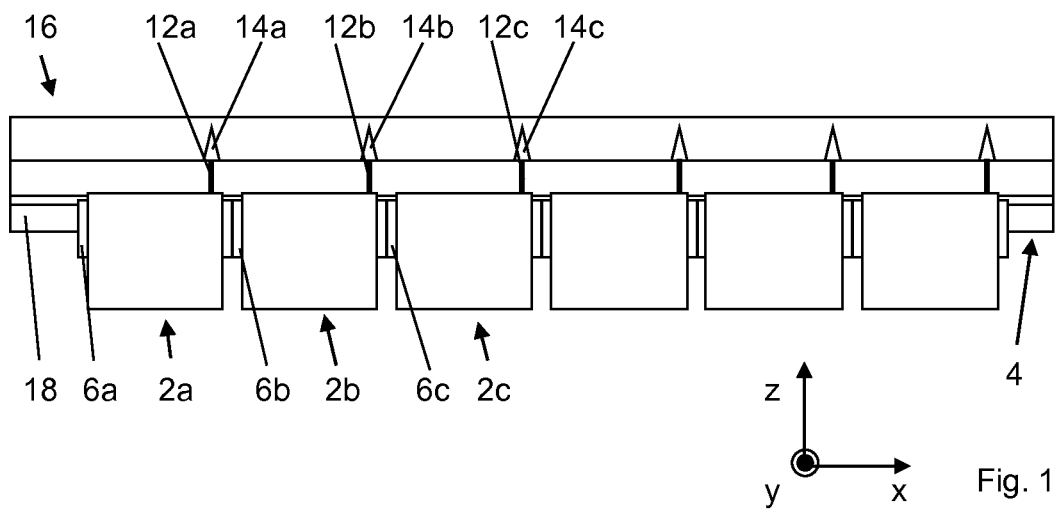
FIG. 1 cabin components comprising a connection according to the invention in a first installation position, and FIG. 2 the cabin components of FIG. 1 in a final installation position.
Figure 2:
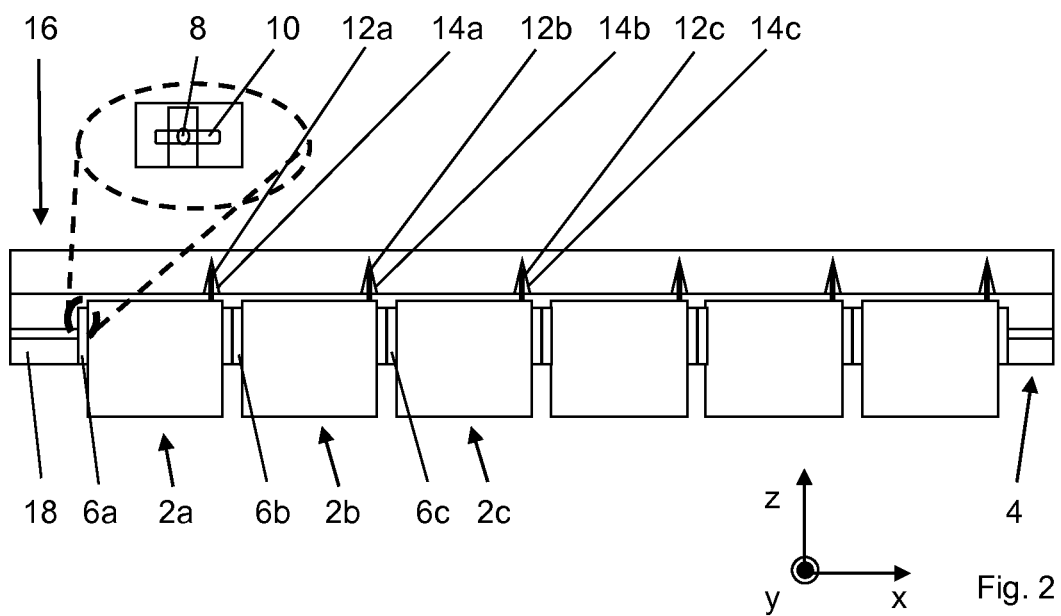

FIGS. 1 and 2 show a front view of a multitude of cabin components that are designed as hatracks 2 or 2a, 2b, 2c, ... in an aircraft. In the x-direction of the aircraft, i.e. in longitudinal direction of the aircraft, said cabin components are suspended side-by-side from a common rail 4 in a first installation position (FIG. 1) and in a final installation position or desired position (FIG. 2).

In each case the arrangement of the hatracks 2a, 2b, 2c, ... on the rail 4 takes place in a pod-like manner by way of a suspension 6 or 6a, 6b, 6c, ... that allows both a sliding movement in the x-direction and a lifting movement in the z-direction, i.e. along the vertical axis of the aircraft. For the purpose of locking the hatracks 2a, 2b, 2c, ... to the rail 4 each hatrack 2a, 2b, 2c, ... comprises a screw-like fastening element 8 (FIG. 2). In the exemplary embodiment shown, the fastening element 8 is arranged on a left-hand body section of the respective hatrack 2a, 2b, 2c, ....

The rail 4 extends in longitudinal direction of the aircraft and is attached to structural sections of the aircraft, for example to frame elements. The rail 4 comprises a hole pattern which at least in some sections comprises elongated holes 10 that extend in the x-direction for receiving the fastening elements 8 of the hatracks 2a, 2b, 2c, ... (FIG. 2). The elongated holes 10 are incorporated in the rail 4 in the region of the fastening elements 8 in hatracks 2a, 2b, 2c, ... that are adjusted relative to each other, with said elongated holes 10 being used to compensate for component tolerances, production tolerances or installation tolerances of the hatracks 2a, 2b, 2c, ... and of the rail 4.

For self-adjustment of the hatracks 2a, 2b, 2c, ... in longitudinal direction of the aircraft a multitude of adjustment devices are provided, each comprising an adjustment spike 12 or 12a, 12b, 12c, ... on the hatrack side, a receiving device 14 or 14a, 14b, 14c, ... for receiving the respective adjustment spike 12a, 12b, 12c, ..., and a common adjustment strip 16 to form the receiving devices 14a, 14b, 14c, ....

The adjustment spikes 12a, 12b, 12c, ... are provided at a distance from the fastening elements 8 on a body section that in the exemplary embodiment shown is located on the upper right, and in each case extend in a pin-like manner away from the hatracks 2a, 2b, 2c, .... In the desired position of the hatracks 2a, 2b, 2c, ..., for the purpose of self-adjustment, they enter at least in some sections the receiving devices 14a, 14b, 14c, ... (FIG. 2) and by way of a threaded element make it possible to set the inclination of the hatracks 2a, 2b, 2c, ... on the longitudinal axis of the aircraft. In addition, the adjustment spikes 12a, 12b, 12c, ... are designed in such a manner that they can take up loads in the x-direction, thus supporting the hatracks 2a, 2b, 2c, ... in longitudinal direction of the aircraft.

In each case the receiving devices 14a, 14b, 14c, ... comprise a cross section that is open in a funnel-like manner in the direction of the adjustment spikes 12a, 12b, 12c, ..., which cross section facilitates the insertion of the adjustment spikes 12a, 12b, 12c, ... and thus adjustment of the hatracks 2a, 2b, 2c, .... The distance between the receiving devices 14a, 14b, 14c, ... in the adjustment strip 16 in longitudinal direction of the aircraft is set in such a manner that after engaging the adjustment spikes 12a, 12b, 12c, ... the hatracks 2a, 2b, 2c, ... are in their desired position (FIG. 2).

Below, a method according to the invention for self-adjustment of the hatracks 2a, 2b, 2c, ... is described. The hatracks 2a, 2b, 2c, ... are, for example, on a left-hand end section 18, shown in the figures, of the rail 4, slid one after the other towards the right onto said rail 4, and are arranged in the region of their desired position so that the adjustment spikes 12a, 12b, 12c, ... are situated opposite the respective receiving device (FIG. 1). Subsequently the hatracks 2a, 2b, 2c, ... are lifted individually, and the adjustment spikes 12a, 12b, 12c, ... enter the receiving devices 14a, 14b, 14c, ... of the adjustment strip 16, wherein due to the funnel-shaped design of the receiving devices 14a, 14b, 14c, ... the adjustment spikes 12a, 12b, 12c, ... and thus the hatracks 2a, 2b, 2c, ... are automatically adjusted relative to each other in the x-direction (FIG. 2). After self-adjustment, as a result of adjustment of the adjustment spikes 12a, 12b, 12c, ..., the inclination of the hatracks 2a, 2b, 2c, ... on the longitudinal axis of the aircraft is set. Finally, for the purpose of locking the hatracks 2a, 2b, 2c, ... in their desired position the screw-like fastening elements 8 are made to engage the elongated holes 10.

Disclosed is a connection means for cabin components 2, in particular for hatracks in an aircraft, which cabin components are arranged on a rail 4 that extends in longitudinal direction of a structure, and which cabin components in each case comprise an adjustment device 12, 14, 16 for self-adjustment in longitudinal direction of the structure, as well as a cabin component 2 for use in such a connection, and an installation method.

LIST OF REFERENCE CHARACTERS 2a, 2b, 2c, ... Hatrack
4 Rail
6a, 6b, 6c, ... Suspension
8 Fastening element
10 Elongated hole
12a, 12b, 12c, ... Adjustment spike
14a, 14b, 14c, ... Receiving device
16 Adjustment strip
18 End section

What is claimed is:

1. A connection device for a plurality of cabin components of an aircraft comprising:
a rail extending in a longitudinal direction of an aircraft structure, wherein the plurality of cabin components are disposed on the rail via at least one suspension device so as to allow a sliding movement of the cabin components in the longitudinal direction and a linear lifting movement of the cabin components in a vertical direction of the aircraft structure orthogonal to the longitudinal direction; and
a plurality of adjustment devices configured to self-adjust each of the plurality of cabin components in the longitudinal direction.

2. The connection device as recited in claim 1, wherein the plurality of cabin components includes a plurality of hatracks.

3. The connection device as recited in claim 1, wherein the at least one adjustment spike is disposed on one of the plurality of cabin components, and wherein the at least one receiving device is disposed on the aircraft structure.

4. The connection device as recited in claim 3, wherein the plurality of adjustment devices includes an adjustment strip extending parallel to the rail, and wherein the at least one receiving device is disposed in the adjustment strip.

5. The connection device as recited in claim 1, wherein the at least one adjustment spike is configured to be moved in an adjustment position one of automatically and manually.

6. The connection device as recited in claim 1, wherein the at least one adjustment spike is configured to bear a load in the longitudinal direction.

7. The connection device as recited in claim 1, wherein the plurality of adjustment devices is configured to adjust an inclination of each of the plurality of cabin components.

8. The connection device as recited in claim 1, wherein the rail includes a hole pattern with a plurality of holes and each of the plurality of cabin components includes a fastening element, one of the plurality of holes receiving the fastening element.

9. The connection device as recited in claim 8, wherein the plurality of holes includes a plurality of elongated holes configured to compensate for tolerances, the at least one adjustment device including at least one adjustment spike and at least one receiving device, wherein the at least one adjustment spike engages the at least one receiving device during the lifting movement of the cabin component.

10. A cabin component of an aircraft comprising:
at least one adjustment device for self-adjustment in a longitudinal direction of an aircraft structure, wherein the cabin component is disposed on a rail of the aircraft extending in the longitudinal direction; and
at least one suspension device configured to allow a sliding movement of the cabin component in the longitudinal direction and a linear lifting movement of the cabin component in a vertical direction of the aircraft structure orthogonal to the longitudinal direction, the plurality of adjustment devices including at least one adjustment spike and at least one receiving device, wherein the at least one adjustment spike engages the at least one receiving device during the lifting movement of the cabin components.

11. A method for connecting a plurality of cabin components comprising:
providing a rail extending in a longitudinal direction of an aircraft structure;
arranging the plurality of cabin components on the rail;
positioning the plurality of cabin components in a region of a desired position in the longitudinal direction by a sliding movement of the cabin components in the longitudinal direction and a linear lifting movement of the cabin components in a vertical direction of the aircraft structure orthogonal the longitudinal direction; and
operating a plurality of adjustment devices automatically or manually for self-adjustment of each of the plurality of cabin components.

* * * * *